United States Patent [19]

Higuchi et al.

[11] Patent Number: 5,276,753

[45] Date of Patent: Jan. 4, 1994

[54] OPTICAL FIBER CONNECTOR

[75] Inventors: Kazuhiro Higuchi; Ren-ichi Yuguchi, both of Ichihara, Japan

[73] Assignee: The Furukawa Electric Co., Ltd., Tokyo, Japan

[21] Appl. No.: 725,798

[22] Filed: Jul. 9, 1991

[30] Foreign Application Priority Data

Jul. 10, 1990 [JP] Japan .................................. 2-182165

[51] Int. Cl.$^5$ ................................................ G02B 6/36
[52] U.S. Cl. ........................................ 385/87; 385/136
[58] Field of Search .................... 385/77, 86, 87, 69, 385/136

[56] References Cited

U.S. PATENT DOCUMENTS

| | | | |
|---|---|---|---|
| 4,339,171 | 7/1982 | Makuch et al. | 385/87 |
| 4,696,537 | 9/1987 | Bauer et al. | 385/87 |
| 4,930,856 | 6/1990 | Pelta | 385/87 |
| 5,073,044 | 12/1991 | Egner et al. | 385/86 |

FOREIGN PATENT DOCUMENTS

| | | |
|---|---|---|
| 0079160 | 5/1983 | European Pat. Off. . |
| 0340728 | 11/1989 | European Pat. Off. . |
| 2926575 | 8/1980 | Fed. Rep. of Germany . |
| 2943180 | 5/1981 | Fed. Rep. of Germany . |

*Primary Examiner*—Rodney B. Bovernick
*Assistant Examiner*—John Ngo
*Attorney, Agent, or Firm*—Armstrong, Westerman, Hattori, McLeland & Naughton

[57] ABSTRACT

Disclosed is an optical fiber connector for connecting an optical fiber cable including a cable core, an inner coating layer formed on the cable core, and an outer coating layer formed on the inner cable layer. The optical connector includes a ferrule to which the cable core is inserted, a first cable fixing member for fixing the inner coating layer, a second cable fixing member for fixing the outer coating layer, a connector cover having an opening, and a fastening ring provided at an outer circumference of the opening, and formed together with the connector cover as a single body. The fastening ring is fastened after the first and second cable fixing members are fitted into the opening.

7 Claims, 3 Drawing Sheets

OPTICAL FIBER CONNECTOR

BACKGROUND OF THE INVENTION

1. Field of the Invention

The present invention relate to an optical fiber connector for connecting optical fiber cables, and more particularly, to an optical fiber connector for connecting optical fiber cables each composed of a cable core comprised of a core and a cladding, an inner coating layer, and an outer coating layer.

2. Description of the Related Art

FIG. 1 is a view showing a mode in which an optical fiber cable C is inserted into an optical fiber connector of a prior art, FIGS. 2 and 3 are cross-sectional views showing how the optical fiber is assembled, and FIG. 4 is a cross-sectional view of the optical fiber cable when assembled. As shown in the figures, the optical fiber cable C consists of a cable core E comprised of a core and a cladding, both made of silica based glass, an inner coating layer P coated on the cable core E, and an outer coating layer S coated on the inner coating layer P. When the cable core E is a single mode optical fiber, a diameter of the core having a reflection index higher than that of the cladding is 10 $\mu$m, and a diameter of the cladding is 125 $\mu$m. The inner coating layer P is formed of a polyaramid fiber such as Kevlar (trademark of Du Pont Corporation), and the outer coating layer S is formed of PVC.

As shown in FIGS. 1 and 4, the cable core E of the optical fiber cable C is inserted into a ferrule F, a spring G is fitted over the cable core E and the ferrule F, a support H is fitted over the spring G, and a projection L of the support H is fitted into a fitting groove M of a plug hole K, to fix the support H thereat. Next, the inner coating layer P next to the cable core E is peeled back and then pulled forward and over a knurled portion N of the support H, a cylinder Q of a pinch member D is fitted over the portion of the inner coating layer P fitted over the knurled portion N and fastened thereat to sandwich the inner coating layer P between the pinch member D and the support H.

Then, as shown in FIG. 2, the outer coating layer S of the optical fiber cable C is fitted over a pinch portion R of the pinch member D, and as shown in FIG. 3, a cylinder T is fitted over the outer coating layer S and fastened from the outside as shown by arrows to sandwich the outer coating layer S between the cylinder T and the pinch member D, to thereby pinch-fasten the optical fiber cable C to the pinch member D.

As shown in FIG. 4, the pinch member D is inserted into an opening B of a connector cover A, made of an elastic material such as a rubber, and then a cap X is fitted over the connector cover A, to thus complete the connection of the optical fiber cable C to the optical fiber connector.

A stop edge W, having an inner diameter $d_2$ which is smaller than an outer diameter $d_1$ of the pinch member D, is provided at an insertion opening V of the opening B and projects inward to prevent an unintentional withdrawal of the pinch member D after it is inserted into the opening B of the connector cover A.

The prior art optical fiber connector, however, suffers from the following disadvantages. The provision of the stop edge W projected inward of the opening B requires the application of a strong pressure, to forcibly press the pinch member D into the opening B. The cover B, however, is formed of an elastic material such as a rubber, and accordingly, this forcible insertion of the pinch member D into the opening B is different and may damage an inner wall of the opening B. Namely, the prior art connection of the optical fiber cable to the optical fiber connector suffers from a low work efficiency, and requires a high level of skill. Accordingly, an automatic connection of the optical fiber cable to the optical fiber connector is practically impossible.

SUMMARY OF THE INVENTION

An object of the present invention is to provide an optical fiber connector in which a pinch member is easily inserted into an opening of a connector cover and is not easily withdrawn therefrom, to thus improve the work efficiency.

Another object of the present invention is to provide an optical fiber connector enabling an automatic connection of an optical fiber cable thereto.

According to the present invention, there is provided an optical fiber connector for connecting an optical fiber cable including a cable core, an inner coating layer formed on the cable core, and an outer coating layer formed on the inner cable layer. The optical fiber connector includes a ferrule to which the cable core is inserted; a first cable fixing member for fixing the inner coating layer, a second cable fixing member for fixing the outer coating layer, a connector cover having an opening in which the first cable fixing member is fitted, a first hole in which the second fixing member is fitted, and a second hole passing over the optical fiber cable, and a fastening ring provided at an outer circumference of the opening, and formed together with the connector cover as a single body. The fastening ring is fastened after the first and second cable fixing members are fitted into the opening and the first hole.

The fastening ring may be made of a force deformation material or thermoplastics.

The fastening ring may be mounted on an inner wall of the opening. The fastening ring may also be mounted on an outer wall of the connector cover at the opening. The fastening ring may be embedded in the connector cover at the opening.

The connector cover may be made of an elastic material.

Also, according to the present invention, there is provided an optical fiber connector for connecting an optical fiber cable including a cable core, and a coating layer formed on the cable core. The optical fiber includes a cable fixing member for fixing the coating layer, a connector cover having an opening in which the cable fixing member is fitted, and a fastening ring provided at an outer circumference of the opening, and formed together with the connector cover as a single body. The fastening ring is fastened after the cable fixing member is fitted into the opening.

BRIEF DESCRIPTION OF THE DRAWINGS

Other objects and features of the present invention will be described in detail with reference to accompanying drawings, in which.

DESCRIPTION OF THE PREFERRED EMBODIMENTS

Figure 1:
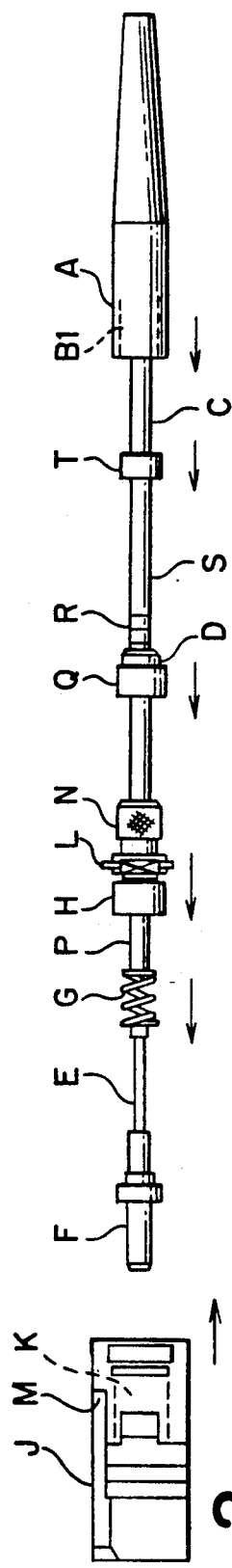
FIGS. 1 to 4 are sectional views showing a connection and assembling of an optical fiber connection of a prior art.
Figure 2:
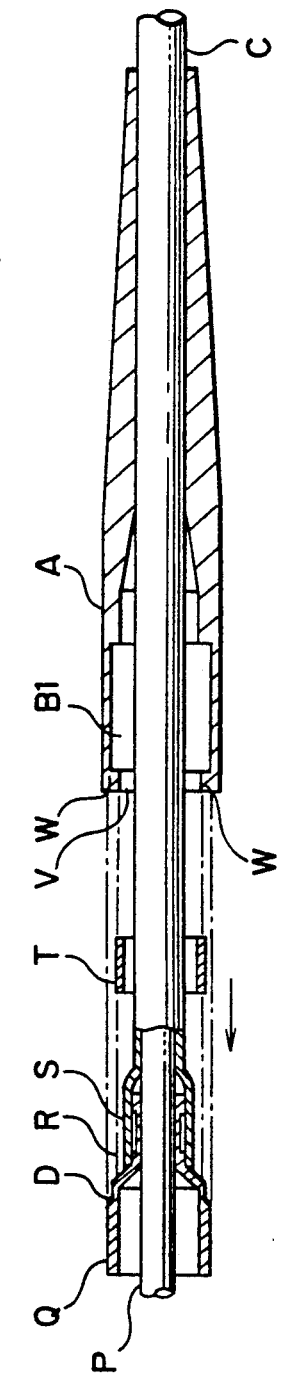
Figure 3:
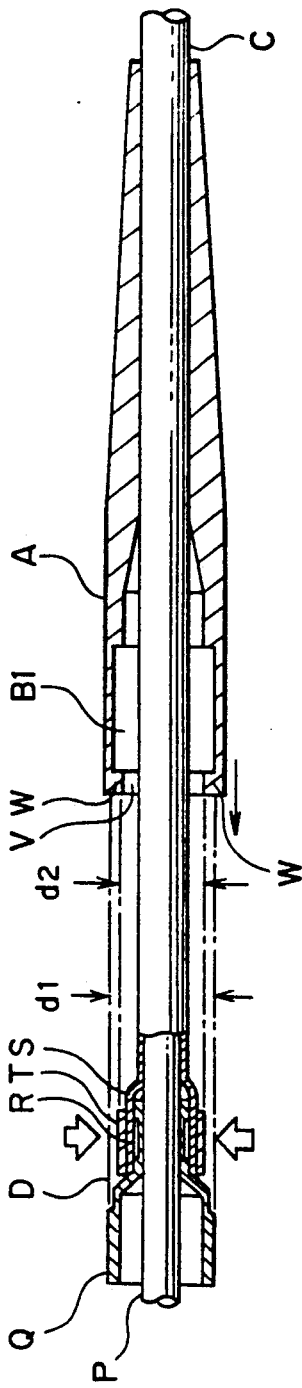
Figure 4:
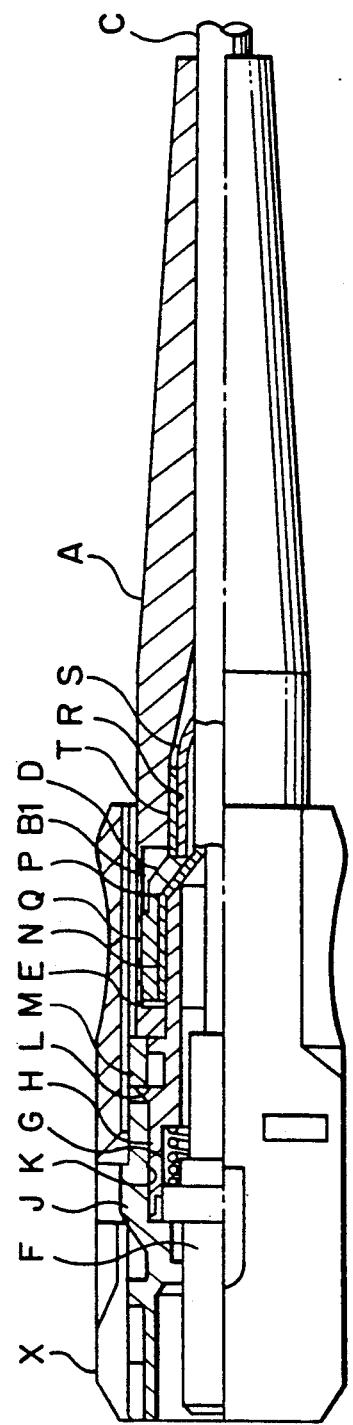
Figure 5:
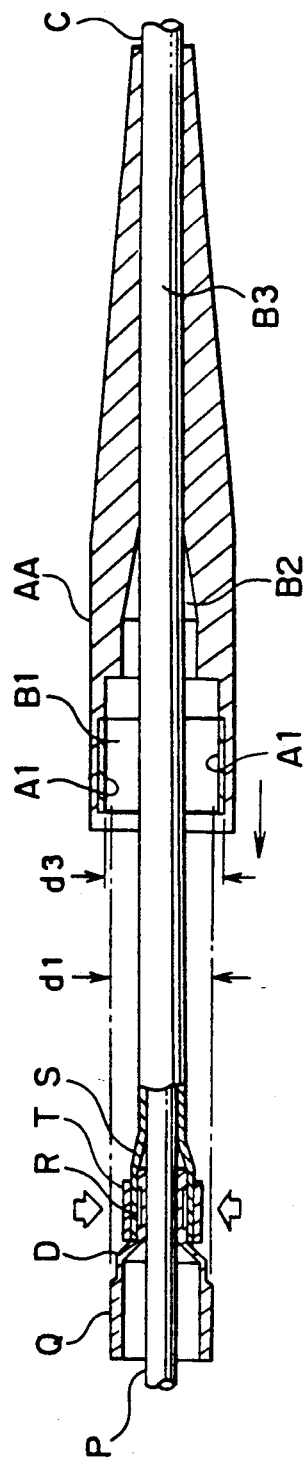
FIGS. 5 to 7 are sectional views showing a connection and assembling of an optical fiber connector of an embodiment in accordance with the present invention.
Figure 6:
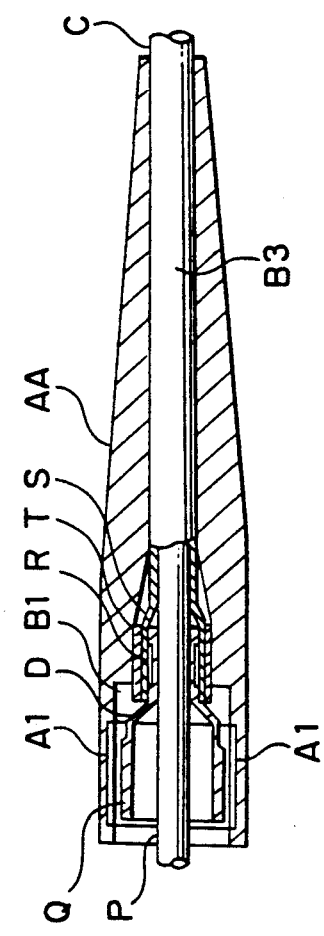
Figure 7:
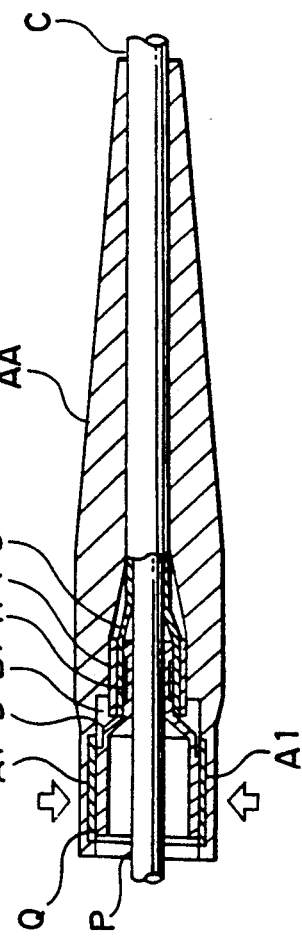

FIG. 5 is a sectional view of an optical fiber connector of an embodiment in accordance with the present invention, and FIGS. 6 and 7 are sectional views showing an assembling of the optical fiber connector. In FIGS. 5 to 7, elements having reference numerals identical to those in FIGS. 1 to 4 indicate corresponding elements in FIGS. 1 to 4.

A cover AA corresponding to the cover A of the prior art, is provided with a fastening ring A1, which is made of a force deformation material such as metal or thermoplastics, has a cylindrical shape, and is integrated with the cover AA made of an elastic material at an inner circumference of the opening B of the cover AA, by an insertion molding process. An inner diameter $d_3$ of the fastening ring A1 is slightly larger than the diameter $d_1$ of the pinch member D to facilitate an insertion of the pinch member D into the fastening ring A1. After inserting the pinch member D to the fastening ring A1, as shown in FIG. 7, the fastening ring A1 is fastened at a portion of the cylinder Q of the pinch member D to thereby fix the pinch member D in the opening B of the connector cover AA, and as a result, the pinch member D can not be unintentionally withdrawn from the opening B.

The connector cover AA has the opening B1 in which a first cable fixing means including the support H, the cylinder portion Q and the frame J, is fitted when the connector is assembled, a first hole B2 in which a second cable fixing means including the pinch member D and the cylinder T is fitted, and a second hole B3 pass over the optical fiber cable C.

Note that the stop edge W inserted into the opening, as shown in FIGS. 1 to 4, is omitted from the optical fiber connector in the present invention.

The fastening ring A1 formed of a force deformation material or thermoplastics can be provided on an outer wall of the connector cover AA formed of an elastic material by molding, to be formed as an integrated part of the connector cover AA, or can be embedded in the connector cover AA.

The omission of the stop edge W eliminates any bending of the cover A made of an elastic material when the pinch member D is inserted to the opening B thereof, and thus facilitate the insertion of the pinch member D. The fastening ring A1 is easily fastened, provides a firm pinching of the pinch member D, and prevents an unintentional withdrawal of the optical fiber cable C from the optical fiber connector. The connecting and assembling operation of the present invention does not require any cumbersome or complex procedures, and accordingly, the connecting and assembling operation can be automated.

The above description is devoted to the connection of the single-mode optical fiber of a silica based glass as an example, but the present invention is not limited to the connection of such optical fiber, and can be applied to other optical fibers such as a multi-mode optical fiber.

Many widely different embodiments of the present invention may be constructed without departing from the spirit and scope of the present invention, and it should be understood that the present invention is not restricted to the specific embodiments described above.

We claim:

1. An optical fiber connector for connecting an optical fiber cable including a cable core, an inner coating layer formed on the cable core, and an outer coating layer formed on the inner cable layer, comprising:

a ferrule to which said cable core is inserted;

a first cable fixing means for fixing said inner coating layer;

a second cable fixing means for fixing said outer coating layer;

a connector cover having an opening in which said first cable fixing means is fitted, a first hole in which said second fixing means is fitted, and a second hole passing over said optical fiber cable; and a fastening ring provided at an outer circumference of said opening, and formed together with said connector cover as a single body, said fastening ring being fastened after said first and second cable fixing means are fitted into said opening and first hole.

2. An optical fiber connector according to claim 1, wherein said fastening ring is made of a force deformation material or thermoplastics.

3. An optical fiber connector according to claim 2, wherein said fastening ring is mounted on an inner wall of said opening.

4. An optical fiber connector according to claim 2, wherein said fastening ring is mounted on an outer wall of said connector cover at said opening.

5. An optical fiber connector according to claim 2, wherein said fastening ring is embedded in said connector cover at said opening.

6. An optical fiber connector according to claim 2, wherein said fastening ring is embedded in said connector cover at said opening.

7. An optical fiber connector according to claim 1, wherein said connector cover is made of an elastic material.

* * * * *